United States Patent [19]
Chen et al.

[11] Patent Number: 5,960,245
[45] Date of Patent: Sep. 28, 1999

[54] OIL SWELL CONTROLLING FUSER MEMBER HAVING A SILICONE T-RESIN

[75] Inventors: Jiann H. Chen, Fairport; Stephen V. Davis, Rochester; Robert A. Lancaster, Hilton, all of N.Y.

[73] Assignee: Eastman Kodak Company, Rochester, N.Y.

[21] Appl. No.: 09/204,601

[22] Filed: Dec. 3, 1998

[51] Int. Cl.$^6$ .................................................. G03G 15/20
[52] U.S. Cl. ........................... 399/333; 428/447; 492/53; 492/56
[58] Field of Search ..................................... 399/324, 333; 219/216; 428/447; 430/124; 492/53, 56

[56] References Cited

U.S. PATENT DOCUMENTS

| | | |
|---|---|---|
| 4,659,621 | 4/1987 | Finn et al. . |
| 4,807,341 | 2/1989 | Nielsen et al. . |
| 5,035,950 | 7/1991 | Del Rosario . |
| 5,166,031 | 11/1992 | Badesha et al. . |
| 5,269,740 | 12/1993 | Fitzgerald et al. . |
| 5,292,562 | 3/1994 | Fitzgerald et al. . |
| 5,292,606 | 3/1994 | Fitzgerald . |
| 5,336,539 | 8/1994 | Fitzgerald . |
| 5,474,821 | 12/1995 | Kass . |
| 5,480,724 | 1/1996 | Fitzgerald et al. . |
| 5,753,361 | 5/1998 | Visser . |

*Primary Examiner*—Joan Pendegrass
*Attorney, Agent, or Firm*—Raymond L. Owens

[57] ABSTRACT

A fuser member having a support metallic core and an outer layer of material formed over the metallic core, the outer layer including composite material, having a crosslinkable poly(dialkylsiloxane) incorporating an oxide, wherein the poly(dialkylsiloxane) has a weight average molecular weight before crosslinking of about 1,000 to 90,000; one or more crosslinkable poly(siloxane) selected from the group consisting of poly(diarylsiloxane), poly(arylalkylsiloxanes) or mixtures thereof wherein the (diaryllsiloxane) or poly (arylalkylsiloxane) has a weight average molecular weight before crosslinking of about 1,000 to 90,000, a silicone T-resin; at least one silane crosslinking agents; and wherein the weight average molecular weight of the mixture of poly(dialkylsiloxane) and poly(siloxane) is about 5,000 to 80,000.

14 Claims, 3 Drawing Sheets

OIL SWELL CONTROLLING FUSER MEMBER HAVING A SILICONE T-RESIN

CROSS REFERENCE TO RELATED APPLICATION

Reference is made to commonly assigned U.S. patent application Ser. No 09/204,598 filed concurrently herewith, entitled "Fuser Member Having Composite Material Including Silicone T-Resin" by Szostek et al, and U.S. patent application Ser. No. 09/205,125 filed concurrently herewith, entitled "Outer Layer For Fuser Member Having An Aryl Silane Crosslinking Agent" by Davis et al, the teachings of which are incorporated herein by reference.

1. Field of the Invention

The present invention relates to the field of fuser members useful in electrophotographic copying.

2. Background of the Invention

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as offset. Offset can also occur on the pressure roller.

Offset is undesirable because it can result in transfer of the toner to non-image areas of succeeding copies and can lead to more rapid contamination of all machine parts in contact with the fusing rollers and to increased machine maintenance requirements. It can also lead to receiver (paper) jams as the toner-roller adhesion causes the receiver sheet to follow the surface of the roller rather than being released to the post-nip paper path.

It is common in some machines to apply release oil externally to the roller in the machine as it is being used. The release oil is typically poly(dimethylsiloxane) (PDMS) oil. PDMS oil does an excellent job in its role as release agent; however, there are associated disadvantages.

The release agent can be spread to other parts of the machine, causing contamination. Further, streaks may appear in the image as a result of imperfect spreading of the release agent across the roller surface. Therefore, it is desirable to improve the release performance of the roller materials in order to be able to minimize the amount of release agent that must be applied to the roller.

The release agent's compatibility with PDMS-based roller materials result in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life as described in U.S. Pat. No. 5,753,361. This wear can also lead to an uneven pressure distribution between the two rollers of the fusing assembly resulting in poor print quality as described in U.S. Pat. No 5,035,950 and as is well known in the art. Another associated problem is the tendency of a silicone layer to soften as it swells with the polydimethylsiloxane release fluids and its subsequent debonding as described in U.S. Pat No. 5,166,031. Here the suggested solution to the problems of the silicone fuser member coating was to develop fluoroelastomer analogs to replace the silicone. However, the toner's tendency to offset is sacrificed.

In applications using a donor roller oiling system, the use of a silicone based outer layer and its subsequent swell by the polydimethylsiloxane release fluid results in excessive swelling leading to failure of the roller to provide a uniform layer of release fluid as described in U.S. Pat. No. 4,659,621. Here the solution to the problems of the silicone fuser member coating was to develop fluoroelastomer analogs to replace the silicone. However, the toner's tendency to offset is sacrificed.

In general there are two methods for decreasing the oil swell of a material. The first is to add inert filler to the material. The mechanism is simply the displacement of polymer resulting in less polymer to swell hence less swell. The disadvantage of this approach is that filler is generally not a good releasing surface which leads to greater contamination and offset. The second and preferred method is to adjust the swell characteristics of the base polymer by affecting such properties as crosslink density and compatibility of the material with the oil. In general the crosslink density is adjusted by the molecular weight of the component resins. The compatibility of the base polymer to the oil can be accomplished through changing the chemical structure of either the fuser member outer layer such as U.S. Pat. No. 4,807,341 or the oil. Changing the chemical structure of the oil is in general costly as it is a consumable. In general changing the chemical structure of the fuser member results in higher contamination and offset.

There continues to be a need for improved fuser and pressure rollers with improved fusing performance, e.g. reduced swell and wear resistance without reducing the toner releasability.

SUMMARY OF THE INVENTION

It is an object of the present invention to provide an improved fuser member with improved release and improved wear resistance properties and provides a reduction in oil swell.

In accordance with the present invention there is provided a fuser member having a support metallic core and an outer layer of material formed over the metallic core, the outer layer including composite material, comprising:

(a) a crosslinkable poly(dialkylsiloxane) incorporating an oxide, wherein the poly(dialkylsiloxane) has a weight average molecular weight before crosslinking of about 1,000 to 90,000;

(b) one or more crosslinkable poly(siloxane) selected from the group consisting of poly(diarylsiloxane), poly(arylalkylsiloxanes) or mixtures thereof wherein the (diaryllsiloxane) or poly(arylalkylsiloxane) has a weight average molecular weight before crosslinking of about 1,000 to 90,000;

(c) a silicone T-resin;

(d) at least one silane crosslinking agents; and (e) wherein the weight average molecular weight of the mixture of poly(dialkylsiloxane) and poly(siloxane) is about 5,000 to 80,000.

An advantage of the present invention is that by reducing the oil swell through varying the chemical structure of the fuser member wear resistance of the roller can be improved resulting in a longer useful life through reduction step.

Another advantage is by reducing the oil swell the differential oil swell is also reduced. This reduction in differential swell and pressure differential from wear allows more reliable paper handling and improved image quality.

Another advantage of the current invention is that it successfully reduces oil swell resulting in the advantages listed above without sacrificing any of the release characteristics thereby not requiring a greater quantity of release agent.

DETAILED DESCRIPTION OF THE PREFERRED EMBODIMENT

Figure 1:
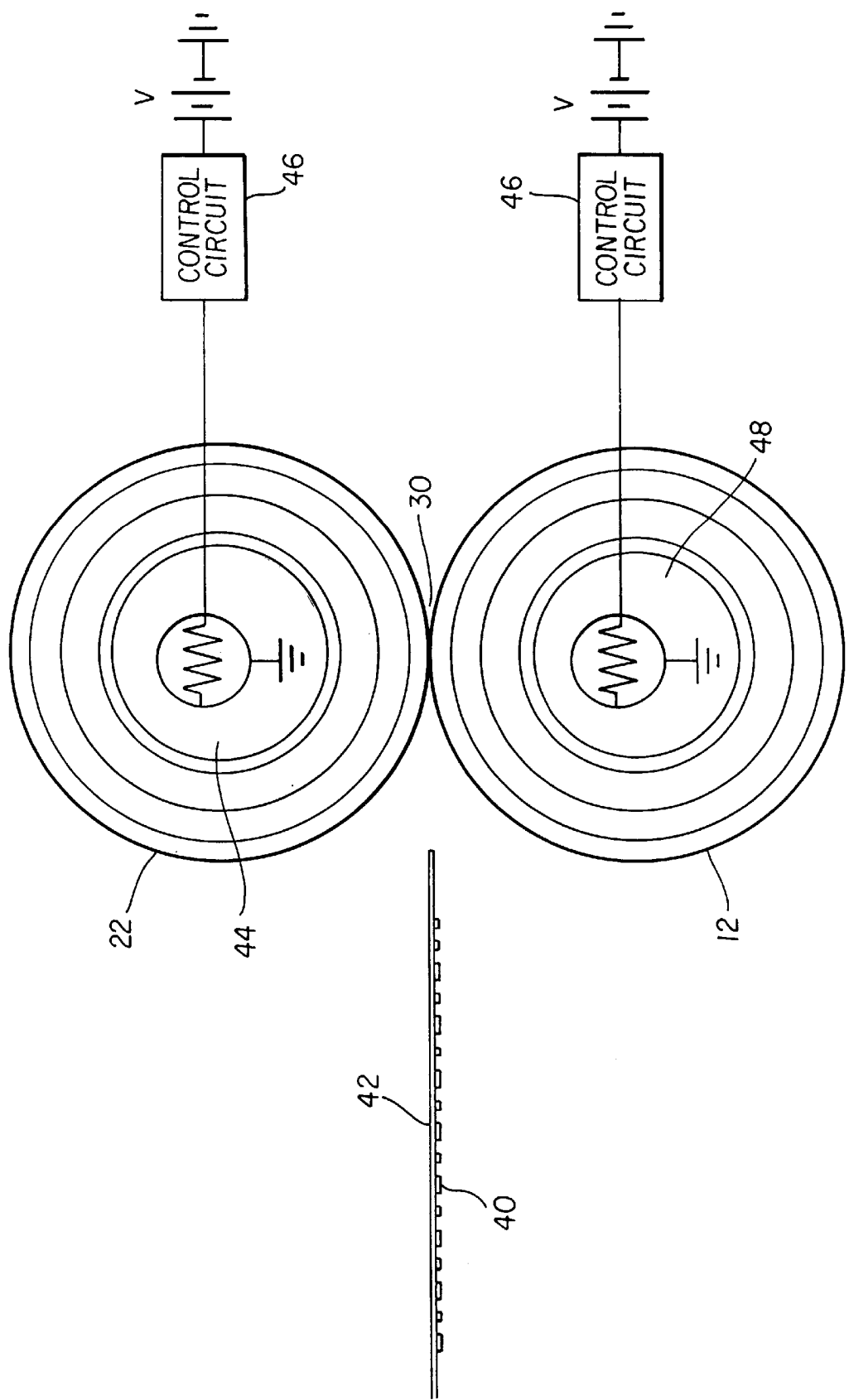
FIG. 1 is a cross-sectional view of a fusing assembly including a fuser roller and a pressure roller.

Turning first to FIG. 1, there is shown a fusing assembly 8 which includes a fusing member, shown as fusing roller 12 and another fusing member, shown as a pressure roller 22. The fuser roller 12 is heated either internally with a heating lamp 48 controlled by control circuit 46 driven by a power supply shown as battery B. The pressure roller 22 may or may not be likewise heated by either internally with a heating lamp 44 controlled by another control circuit 46. In place of using an internal heating element the exterior surface of fuser roller 12 and pressure roller 22 can be heated. The fuser roller 12 and pressure roller 22 come together under pressure to form a nip 30. The receiver sheet 42 with unfused toner 40 pass through the nip to fuse the toner 40 to the receiver sheet 42.

Figure 2:
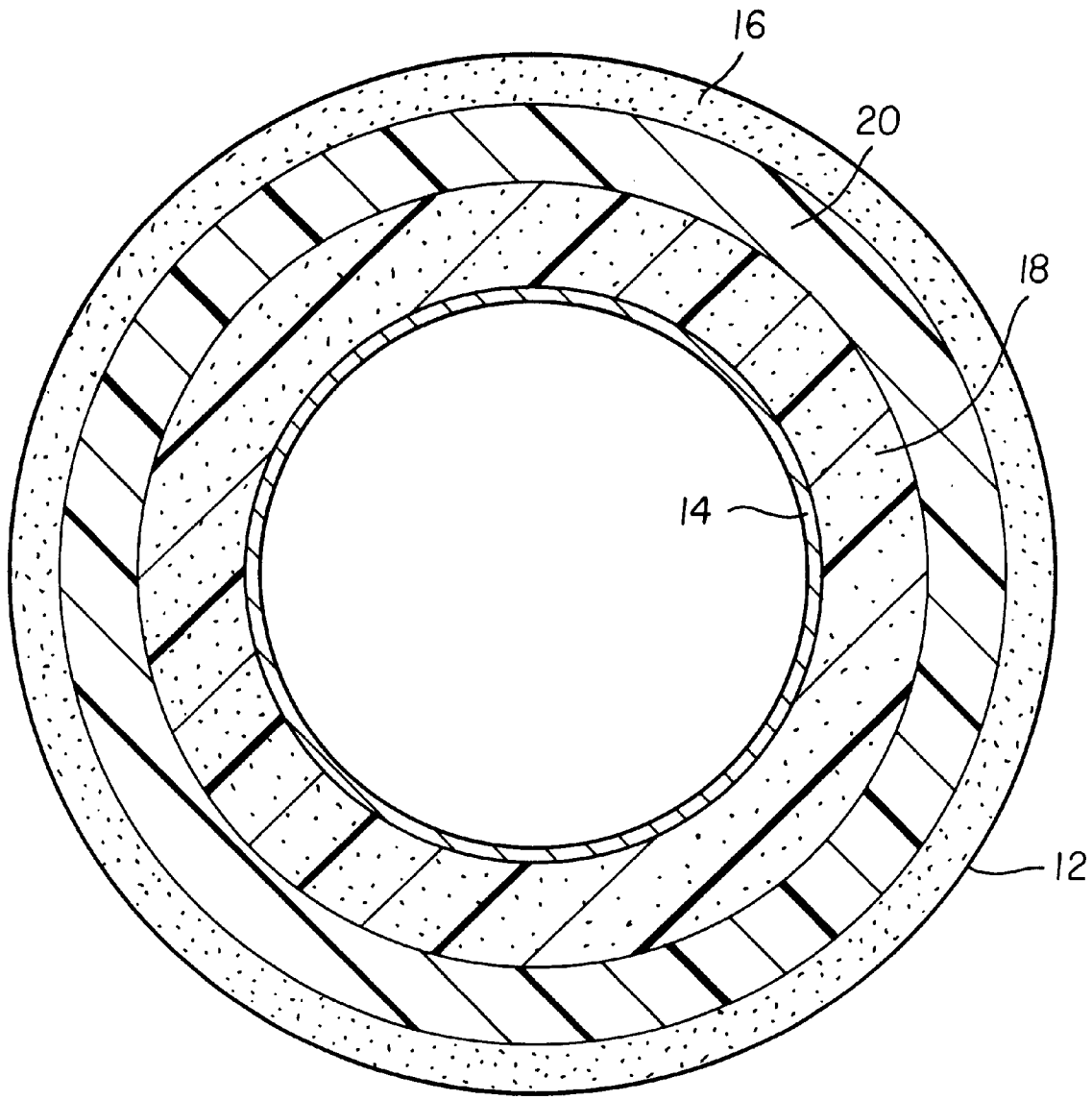
FIG. 2 is a cross-sectional view of the fusing member of FIG. 1.

In FIG. 2, there is shown a fusing member 10 which is in the form of a roller such as fuser roller 12. Also, the pressure roller 22 can have the same or similar configuration as shown in FIG. 2. The fusing roller 12 includes a metallic core 14 which is preferably formed of an aluminum shaft which is connected to a gudgeon (not shown) which has a thermal conductivity lower than the metallic core 14 disposed over the metallic core 14 is an outer layer 16. The outer layer 16 includes a silicone T-resin and other materials that will be discussed later. As shown it is often preferable to include intermediate layers between the metallic core 14 and the outer layer 16. In the embodiment shown there is a cushion layer 18 formed on the metallic core 14 and another intermediate barrier layer 20 formed between the outer layer 16 and the cushion layer 18.

In practice the cushion layer 18 and the intermediate layer 20 can be omitted. When present both layers would be formed of a temperature resistant material. In the case of the fuser member being a fusing roller (12 in FIG. 1) it can be desirable for the cushion layer 18 to be thermally conductive such a metal oxide filled silicone elastomer. In the case of the fuser member being a pressure roller (22 in FIG. 1) it may be desirable for the cushion layer 18 to be of low thermally conductivity such a silicon oxide filled silicone elastomer.

In either application the other intermediate layer 20 can be either to control surface finished or to act as an adhesion promotion or oil barrier layer. The fuser member of the present invention can be either the fuser roller, as defined above, or the pressure roller also as defined above.

The outer layer 16 of the fuser member of the invention includes a crosslinked poly(dialkylsiloxane) having at least one oxide. The fillers are an oxide or mixture of oxides. Typical oxides include metal oxides such as aluminum oxide, iron oxide, tin oxide, zinc oxide, copper oxide and nickel oxide. Silica (silicon oxide) can also be used. Other silicone resins is added being one or more crosslinkable poly(diarylsiloxane), poly(arylalkylsiloxanes) or mixtures thereof. An additional silicone T-resin is added to the crosslinkable poly(dialkylsiloxane) as well as silane crosslinking agents. Examples of suitable materials for a crosslinked poly(dialkylsiloxane) incorporating an oxide, are poly(dimethylsiloxane) having a weight average molecular weight before crosslinking of about 5,000 to 80,000 of the outer layer 16 are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,548,720 (tin oxide filler), U.S. Pat. No. 5,336,539, (nickel oxide).

Next, one or more crosslinkable poly(diarylsiloxane), poly(arylalkylsiloxanes) or mixtures thereof wherein the (diaryllsiloxane) or poly(arylalkylsiloxane) has a weight average molecular weight before crosslinking of about 1,000 to 90,000 are added to the poly(dialkylsiloxane).

Silanol-terminated poly(dialkylsiloxane), poly(diarylsiloxane), and poly(arylalkylsiloxanes) polymers and methods of their preparation are well known. They are readily commercially available, e.g., from Huls America, Inc., (United Chemical) 80 Centennial Ave., Piscataway, N.J., U.S.A., and having the repeat unit structure:

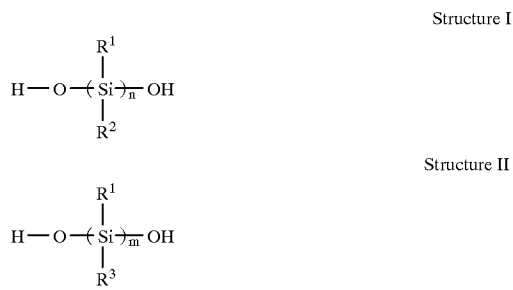

Structure I

Structure II

-continued

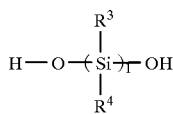

Structure III

For purpose of the present invention 1, m, and n are integers such that the Structure I, Structure II, and Structure III polymers independently have a weight average molecular weight of from 1,000 to 90,000. $R^1$ and $R^2$ are independently alkyl groups such as methyl, ethyl, propyl, butyl, pentyl, and hexyl. $R^3$ and $R^4$ are independently aryl groups such as phenyl. The molecular weights are chosen such that the weight average molecular weight of the mixture of siloxane resins is between 5,000 and 80,000. If the molecular weight were below 5,000, the final crosslinked network would have a high crosslink density that would make the material too hard and brittle, and not resilient enough to serve practically in a base cushion layer. If the molecular weight were above 80,000, the final crosslinked network would be too unstable under conditions of high temperature and cyclic stress (i.e., there would be too much creep and change in hardness over time).

The primary crosslinked poly(dialkysiloxane) material used for the Examples and Comparative Examples is Stycast® 4952, sold by Grace Specialty Polymers, Massachusetts. Stycast® 4952 is composed of a network-forming polymer that is a silanol-terminated (α-ω-hydroxy-) poly (dimethyl siloxane) (PDMS). The number of repeat units is such that the silanol-terminated PDMS (α-ω-dihydroxypolydimethyl siloxane has a weight average molecular weight of from 5,000 to 80,000. This composition includes the filler. The filler is between 55–70 wt % aluminum oxide and 5–15 wt % iron oxide particulate fillers. Polyethyl silicate (condensed tetraethylorthosilicate) is present as the crosslinking agent.

Figure 3:
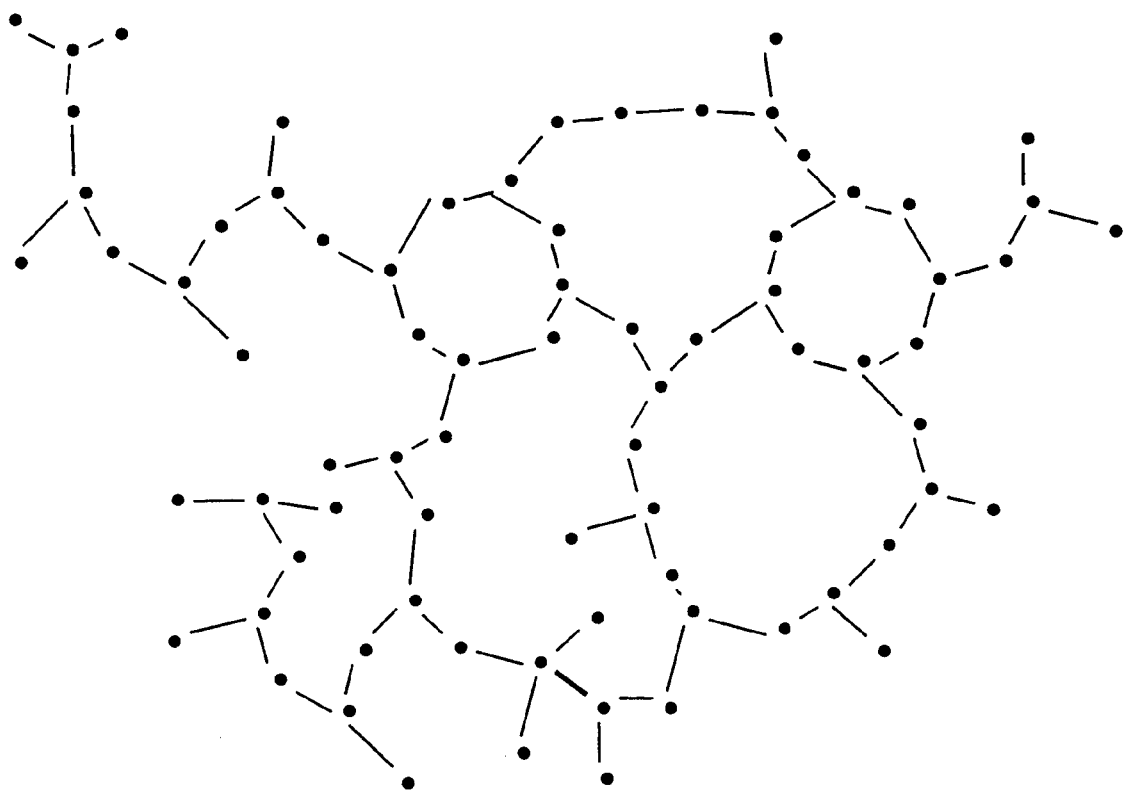
FIG. 3 is an example of a silicon T-resin which can be used in the present invention.

The second component of the outer layer 16 is a silicone T-resin. A silicone T-resin as described in United Chemical catalog (page 280 5$^{th}$ edition) is a highly crosslinked material with the empirical formula (or repeat unit) $RSiO_{1.5}$ formed from polymerization of silsesquioxane monomers to form by nature an unordered structure. R can be any alkyl or aryl group including but not limited to methyl, phenylpropyl, phenyl, or phenylvinyl. The term "unordered structure" means that the organization of repeat-units is substantially random. An example structure for a such formed silicone T-resin is shown in FIG. 3 where • represents a repeat unit.

The presence of silicone T-resin in concentrations greater than 26% result in materials whose wear resistance is too low to allow for long roller life. Addition silicone T-resin in amounts less than 5% is insufficient to give the fusing performance benefits described in this invention.

The mixture of silanol terminated poly(dialkylsiloxane), poly(diarylsiloxane), and poly(arylalkylsiloxanes) polymers can be crosslinked with multifunctional silanes. The multifunctional silanes that can serve as crosslinking agents for the Structure I, II, and III polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2N$—), or alkyliminoxy ($R_2C$=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, methyltris(butanone oxime)silane, and methyltris (diethylamino)silane.

In addition to any of the above crosslinking agent being added, addition aryl-based silanes are added including phenyltrimethoxysilane and diphenyltrimethoxysilane where this additional crosslinking agent has the general formula a silane crosslinking agent containing at least one aryl group of the general formula $$R^1{}_xSi(OR^2)_{4-x}$$

where $R^1$ is aryl and $R^2$ is aryl or alkyl and x is an integer less than 4.

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol.

For the preferred embodiment, the various components of the composite material can have the following weight percentages:

(a) 10–45 wt % α-ω-hydroxy-poly(dialkylsiloxane) having a weight average molecular weight of from 1,000 to 90,000

(b) 30–85 wt % oxide fillers, especially the combination of 55–70 wt % aluminum oxide and 5–15 wt % iron oxide;

(c) 5–50 wt % of one or more α-ω-hydroxy-poly (diarylsiloxane) and poly(arylalkylsiloxane) polymers having a weight average molecular weight of from 1,000 to 90,000;

(d) 0.5–5 wt % crosslinking agent;

(e) 5–26 parts per 100 parts polymer silicone T-resin;

(f) 0–20 parts per 100 parts arylsilane crosslinking agent; and (g) 0.05–2 wt % catalyst.

To form the outer layer 16 of a fuser member in accordance with the invention, the poly(dialkylsiloxane) and one of more poly(diarylsiloxane), poly(arylalkylsiloxanes) or mixtures thereof polymers, an excess of the stoichiometric amount of multifunctional silane to form crosslinks with all the hydroxy end groups, and the appropriate amount of filler are thoroughly mixed on a three-roll mill. The silicone T-resin is also incorporated at this time. The arylsilane is then be added at this time or prior to coating. If a catalyst is necessary, it is then added to the mix with thorough stirring. The mix is then degassed and injected into a mold surrounding the fuser member, e.g. roll, core to mold the material onto the core. The covered core remains in the mold for a time sufficient for some crosslinking to occur (e.g., 4 hours). The covered roll is then removed from the mold and heated to accelerate the remaining crosslinking.

It is currently preferred to apply the outer layer 16 over the metallic core 14 which has been conversion coated and primed with metal alkoxide primer in accordance with commonly assigned U.S. Pat. No. 5,474,821. If the outer layer 16 is coated over another coating layer, one or more methods of layer-to-layer adhesion improvement, such as corona discharge treatment of the other coating layer's surface, may be applied prior to application of the material of this invention. Various methods of layer-to-layer adhesion improvement are well known to one skilled in the art.

The outer layer 16 can be used as an outer coating layer over an oil barrier layer. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a curable polyfunctional poly($C_{(1-6)}$ alkyl)phenylsiloxane polymer, one or more fillers and an accelerator for promoting crosslinking between the curing agent and the fluorocarbon copolymer. Other candidates for oil barrier layer include most heat stable materials having no PDMS oil swell.

The thickness of the outer layer 16 and any other layers present, e.g. cushion layers 18 and the like, can provide the desired resilience to the fuser roller 12, and the outer layer 16 can flex to conform to that resilience. The thickness of the cushion layer 18 and other layers can be chosen with consideration of the requirements of the intended application. Usually, the outer layer 16 would be thinner than the cushion layer 18. For example, cushion layer 18 thickness in the range from 0.5 to 6.0 mm have been found to be appropriate for various applications.

The release fluid is continuously coated over the surface of the fuser roller 12 in contact with the toner image. The fuser roller 12 can be used with polydimethylsiloxane or functionalized polydimethylsiloxane release oils at normally used application rates or at reduced application rates, generally but not limited to about 0.5 mg/copy to 10 mg/copy (the copy is 8.5 by 11 inch 20 pound bond paper).

The rollers produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

EXAMPLES

The following examples are presented for a further understanding of the invention.

Example 1

100 parts Stycast® 4952 (a crosslinked poly (dimethylsiloxane) incorporating an oxide) was blended with 10 parts PS 090 obtained from United Chemical being a poly(dimethylsiloxane)-co-poly(diphenylsiloxane) containing 18–22 mole % phenyl groups. 3 parts of PO330 obtained from United Chemicals being phenyltrimethoxysilane and 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 2

100 parts Stycast® 4952 (a crosslinked poly (dimethylsiloxane) incorporating an oxide) was blended with 25 parts PS 090 obtained from United Chemical being a poly(dimethylsiloxane)-co-poly(diphenylsiloxane) containing 18–22 mole % phenyl groups. 3 parts of PO330 obtained from United Chemicals being phenyltrimethoxysilane and 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 3

100 parts Stycast® 4952 (a crosslinked poly (dimethylsiloxane) incorporating an oxide) was blended with 50 parts PS 090 obtained from United Chemical being a poly(dimethylsiloxane)-co-poly(diphenylsiloxane) containing 18–22 mole % phenyl groups and was blended with 10 parts GE Tospearl 145 spherhical fine white powder on a 3 roll mill. 3 parts of PO330 obtained from United Chemicals being phenyltrimethoxysilane and 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 1

100 parts Stycast® 4952 was blended with CAT50® catalyst at the rate of one part of catalyst to 200 parts by weight Stycast® 4952. The mixture was degassed and molded in the shape of a 90mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Material Testing

Swell

Oil swell was measured by immersing a weighed sample in 1000 cts Dow Corning DC200 polydimethylsiloxane for 7 days at 175° C. and calculating the weight.

Wear

The wear rate test of molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. 480 Cycles were accumulated with a 1 kg load on a 9/16 inch wide sample. The depth of the wear track was then measured on a Federal 2000 Surfanalyzer using a chisel tip at 25 mm/min.

Oil wear

The wear test above was performed on a sample which had be soaked in 1000 cts polydimethylsiloxane oil at 175° C. for 7 days.

Toner Release Test

The test samples are employed to evaluate the toner offset and release force characteristics of the outer layer 16. Two samples are cut approximately 1-inch square of each example. One of these squares is left untreated by release agent (the dry sample). To the surface of the other sample is applied in unmeasured amount of 1000 cts polydimethysiloxane (the oil sample).

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polysytrene acrylate SB75 toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

| 1 | 0% offset |
| 1–2 | 0–20% offset |
| 2–3 | 20–50% offset |
| 3–4 | 50–90% offset |
| 4–5 | 90–100% offset |

Qualitative assessment of the force required for delamination of the paper from the sample is as follows:

| 1 | low release force |
| 2 | moderate release force |
| 3 | high release force |

The results are shown in the following table:

| Sample | swell (%) | Wear (mils) | Oil Wear (mils) | Dry Release/Offset | Oil Release/Offset |
|---|---|---|---|---|---|
| E1 | 8.3 | 6.4 | 8.6 | 1/1.2 | 1/1.2 |
| E2 | 4.6 | 7.1 | 5.7 | 1.1/1.2 | 1.1/1.2 |
| E3 | 0.4 | 8 | 6.2 | 1.2/1.2 | 1.3/1.2 |
| CE1 | 7 | 5 | 7.9 | 1/1.5 | 1/1.5 |

Advantages

The examples and comparative example demonstrate that incorporation of one or more crosslinkable poly(diarylsiloxane), poly(arylalkylsiloxanes) or mixtures thereof into a poly(dialkylsiloxane) along with a small amount of a silicone T-resin and an arylsilane crosslinking agent decrease the oil swell and improve the wear resistance of the materials comparing the oil swollen wear to the dry wear. Further it is demonstrated that superior toner release properties were obtained.

The invention has been described with particular reference to preferred embodiments thereof but it will be understood that variations and modifications can be effected within the spirit and scope of the invention.

PARTS LIST 8 fusing assembly
10 fusing member
12 fuser roller
14 metallic core
16 outer layer
18 cushion layer
20 intermediate layer
22 pressure roller
30 nip
40 unfused toner
42 receiver sheet
44 heating lamp
46 control circuit
48 heating lamp

What is claimed is:

1. A fuser member having a support metallic core and an outer layer of material formed over the metallic core, the outer layer including composite material, comprising:

(a) a crosslinkable poly(dialkylsiloxane) incorporating an oxide, wherein the poly(dialkylsiloxane) has a weight average molecular weight before crosslinking of about 1,000 to 90,000;

(b) one or more crosslinkable poly(siloxane) selected from the group consisting of poly(diarylsiloxane), poly (arylalkylsiloxanes) or mixtures thereof wherein the (diaryllsiloxane) or poly(arylalkylsiloxane) has a weight average molecular weight before crosslinking of about 1,000 to 90,000;

(c) a silicone T-resin;

(d) at least one silane crosslinking agents; and (e) wherein the weight average molecular weight of the mixture of poly(dialkylsiloxane) and poly(siloxane) is about 5,000 to 80,000.

2. A fuser member having a support metallic core and an outer layer of material formed over the metallic core, the outer layer including composite material, comprising:

(a) a crosslinkable poly(dialkylsiloxane) incorporating an oxide, wherein the poly(dialkylsiloxane) has a weight average molecular weight before crosslinking of about 1,000 to 90,000;

(b) one or more crosslinkable poly(siloxane) selected from the group consisting of poly(diarylsiloxane), poly (arylalkylsiloxanes) or mixtures thereof wherein the (diaryllsiloxane) or poly(arylalkylsiloxane) has a weight average molecular weight before crosslinking of about 1,000 to 90,000;

(c) a silicone T-resin;

(d) at least one silane crosslinking agent having at least one aryl group of the general formula

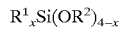

$R^1_x Si(OR^2)_{4-x}$ wherein $R^1$ is aryl and $R^2$ is aryl or alkyl and x is an integer less than 4; and (e) wherein the weight average molecular weight of the mixture of poly(dialkylsiloxane) and poly(siloxane) is about 5,000 to 80,000.

3. The fuser member according to claim 2, wherein the crosslinked poly(dialkylsiloxane) incorporating an oxide, includes an (α-ω-hydroxy-) poly(dialkylsiloxane) with the general structure

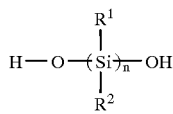

where n is an integers such the weight average molecular weight is from 1,000 to 90,000. $R^1$ and $R^2$ are independently alkyl groups such as methyl, ethyl, propyl, butyl, pentyl, or hexyl, and a polyethylsilicate crosslinking agent; and an oxide filler containing particles of aluminum oxide or iron oxide.

4. The fuser member according to claim 2, wherein the crosslinked (a) poly(dialkylarylsiloxane) and (b) poly(diarylsiloxane) respectively have general structures (a)

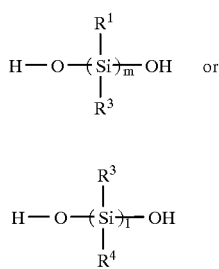

or (b)

$$H-O-(Si)_l-OH$$
with $R^3$ above and $R^4$ below where 1 and m are integers such the weight average molecular weight is from 1,000 to 90,000, $R^1$ is an alkyl group including methyl, ethyl, propyl, butyl, pentyl, and hexyl; $R^3$ and $R^4$ are independently aryl groups including phenyl.

5. A fuser member having a support metallic core and an outer layer of material formed over the metallic core, the outer layer including composite material, comprising:
(a) a crosslinkable poly(dialkylsiloxane) incorporating an oxide, wherein the poly(dialkylsiloxane) has a weight average molecular weight before crosslinking of about 1,000 to 90,000;
(b) one or more crosslinkable poly(diarylsiloxane) or poly(arylalkylsiloxanes) wherein the (diaryllsiloxane) or poly(arylalkylsiloxane) has a weight average molecular weight before crosslinking of about 1,000 to 90,000;
(c) an unordered structure silicone T-resin having a highly crosslinked material with the empirical formula $RSiO_{1.5}$ wherein R is an alkyl or aryl group;
(d) one or more silane crosslinking agents; and
(e) wherein the weight average molecular weight of the mixture of poly(dialkylsiloxane) and poly(siloxane) is about 5,000 to 80,000.

6. The fuser member according to claim 5 wherein the silicone T-resin includes an amount from 5 to 26 parts of silicone T-resin per 100 parts of crosslinked poly(dialkylsiloxane) incorporating an oxide.

7. The fuser member according to claim 1 wherein silane crosslinking agent is present in an amount of from greater than 0 but less than 20 parts per 100 parts of crosslinked poly(dialkylsiloxane) incorporating an oxide.

8. The fuser member according to claim 1 one or more crosslinkable poly(diarylsiloxane) or poly(arylalkylsiloxanes) is present in an amount of from about 5 to 50 wt%.

9. The fuser member according to claim 5 wherein the fusing member is a fuser roller or a pressure roller.

10. The fuser member according to claim 5 further including an oil barrier layer disposed between the support metallic core and the outer layer.

11. The fuser member according to claim 10 further including a cushion layer disposed between the oil barrier layer and the support metallic core.

12. The fuser member according to claim 5 further including a cushion layer disposed between the support metallic core and the outer layer.

13. A fuser member having a support metallic core and an outer layer of material formed over the metallic core, the outer layer including composite material, comprising:
(a) a crosslinkable poly(dialkylsiloxane) incorporating an oxide;
(b) one or more crosslinkable poly(diarylsiloxane) or poly(arylalkylsiloxanes);
(c) a silicone T-resin;
(d) one or more silane crosslinking agents; and
(e) the amount of poly(diarylsiloxane) or poly(arylalkylsiloxanes) being selected such that the fuser member has a swelling of less than 10 percent by weight of the composite material in 1,000 cts oil at 175° C. for seven days.

14. The fuser member of claim 13 wherein the fuser member has a swelling of less than 5 percent by weight of the composite material in 1,000 cts oil at 175° C. for seven days.

* * * * *